(12) United States Patent
Taylor (10) Patent No.: US 7,250,216 B2
(45) Date of Patent: Jul. 31, 2007

(54) LIGHTER-WEIGHT REINFORCED DECORATIVE COMPOSITE MATERIAL

(75) Inventor: Steven J. Taylor, Massillon, OH (US)

(73) Assignee: Crane Composites, Inc., Channahon, IL (US)

(*) Notice: Subject to any disclaimer, the term of this patent is extended or adjusted under 35 U.S.C. 154(b) by 597 days.

(21) Appl. No.: 10/360,785

(22) Filed: Jun. 19, 2002

(65) Prior Publication Data

US 2005/0186399 A1    Aug. 25, 2005

(51) Int. Cl.
*B32B 27/00* (2006.01)
*B32B 29/07* (2006.01)

(52) U.S. Cl. ............... 428/423.7; 428/913.3; 428/425.1; 428/292.7

(58) Field of Classification Search ............ 428/195, 428/36.3, 203, 76, 205, 195.1, 423.7, 425.1, 428/147, 292.7, 165, 913.3; 156/327, 494, 156/243, 166, 307.4; 442/417, 412, 27, 33, 442/34, 212, 295, 297
See application file for complete search history.

(56) References Cited

U.S. PATENT DOCUMENTS

| | | | |
|---|---|---|---|
| 3,616,370 A | 10/1971 | Jennings | 204/159.15 |
| 3,798,111 A * | 3/1974 | Lane et al. | 428/219 |
| 3,936,341 A * | 2/1976 | Nanoux | 156/242 |
| 4,126,719 A * | 11/1978 | Koyanagi et al. | 428/34.5 |
| 4,741,968 A | 5/1988 | Dion et al. | 428/480 |
| 4,927,572 A | 5/1990 | van der Hoeven | 264/22 |
| 5,093,185 A | 3/1992 | Ungar et al. | 428/204 |
| 5,397,636 A * | 3/1995 | Miyao et al. | 428/195.1 |
| 6,093,473 A | 7/2000 | Min | 428/147 |
| 6,242,055 B1 | 6/2001 | Neumann et al. | 427/493 |
| 6,274,674 B1 | 8/2001 | Chang et al. | 525/129 |
| 6,284,327 B1 | 9/2001 | Neumann et al. | 427/493 |
| 6,300,279 B1 | 10/2001 | Macedo | 503/227 |
| 6,325,884 B1 | 12/2001 | Karam | 156/278 |
| 6,340,504 B1 | 1/2002 | Neumann et al. | 427/493 |
| 6,558,799 B2 * | 5/2003 | Takeuchi et al. | 428/423.1 |
| 6,676,798 B1 * | 1/2004 | Murray | 156/307.4 |
| 6,790,252 B2 * | 9/2004 | Smith et al. | 75/240 |
| 6,864,019 B2 | 3/2005 | Hegel et al. | 430/1 |
| 7,081,300 B2 * | 7/2006 | Laurence et al. | 428/423.7 |
| 2001/0054264 A1 | 12/2001 | Votolato et al. | 52/263 |
| 2002/0025426 A1 | 2/2002 | Karam | 428/329 |
| 2002/0043327 A1 | 4/2002 | Macedo | 156/230 |
| 2002/0160680 A1 | 10/2002 | Laurence et al. | 442/394 |

(Continued)

FOREIGN PATENT DOCUMENTS

CA    1083938    8/1980

(Continued)

*Primary Examiner*—N. Edwards
(74) *Attorney, Agent, or Firm*—Fitzpatrick, Cella, Harper & Scinto (57) ABSTRACT

A reinforced composite material includes a decorative layer, and a strengthening panel, preferably directly fused to each other. The decorative layer is preferably made of one to three layers of (preferably printed) paper impregnated with a resin such as polyester or melamine resin. The strengthening panel may have a foil facing on one surface for fusion to the decorative layer, or may be roughed and directly fused to the decorative layer without such foil facing. Also provided is a method for the production of such a material.

9 Claims, 5 Drawing Sheets

U.S. PATENT DOCUMENTS

2004/0026027 A1 2/2004 Walters .................. 156/272.2
2006/0068213 A1 3/2006 O'Brien et al. ............. 428/524

FOREIGN PATENT DOCUMENTS

| EP | 1 342 567 A1 | 9/2003 |
| FR | 2 332 129 A1 | 6/1977 |
| FR | 2 740 069 A1 | 4/1997 |
| JP | 57-176160 | 10/1982 |
| WO | WO 00/41883 A1 | 7/2000 |

\* cited by examiner

LIGHTER-WEIGHT REINFORCED DECORATIVE COMPOSITE MATERIAL

This application is a non-provisional application converted from U.S. Provisional Patent Application No. 60/390,262, filed Jun. 19, 2002.

BACKGROUND OF THE INVENTION

1. Field of the Invention

The present invention relates generally to construction materials and more particularly to a reinforced decorative composite material that includes a light-weight material, preferably decorative, such as a small number of layers of resin-impregnated paper, and a strengthening panel such as fiberglass reinforced plastic ("FRP") secured together, and to the manufacture of such a composite material.

2. Description of Related Art

High pressure laminate materials have been manufactured and sold for many years, and are familiar to many from their wide-spread use in kitchens and areas requiring very durable and decorative surface attributes. Such laminates are typically made of layers of paper impregnated with resin, compressed in a press or the like and heated to produce the desired laminate. One layer of paper may have a decorative pattern that remains visible in the finished product. The exact types of paper and of resins used, as well as the pressures, equipment and temperatures used, and the precise order of steps, are well known to those in the art. Typically, five to seven layers of paper may be incorporated in such a laminate material. A great variety of products of this type are commercially available from the Formica Corporation, under the trademark Formica, owned by that company. Examples of techniques and materials used in the manufacture of such laminates can be found in U.S. Pat. No. 5,558,906, assigned on its face to Formica Technology Inc., the entire disclosure of which is incorporated herein by reference, although it is to be understood that the present inventor does not claim ownership of the processes claimed in that patent, which are believed to be owned by that patent's assignee of record.

HPL products, however, are generally brittle enough that they must be mounted on a layer of wood or other material of sufficient strength and rigidity, for use in the kitchen, and on any horizontal surface. Vertical surface applications of HPL's can be enhanced by a pre-laminated panel with the HPL as the outward side. A primary application of such a panel will likely be vertical wall surfaces, where drywall is a common substrate.

It is desirable to be able to use HPL products in environments where the product will be exposed to relatively high levels of wear and tear, moisture, and mechanical loads, without the need to mount the HPL on a mechanically strong layer of wood or other materials. For example, it would be desirable to be able to use decorative materials like HPL products in vertical wall applications in schools, hospitals, restaurants and other public areas that are subject to large amounts of traffic, and where conventional HPL cannot easily be used.

The present inventor has reduced to practice an invention which meets that object, and has disclosed that invention in his previously-filed patent application (application Ser. No. 10/081,629, filed Feb. 20, 2002), the entire content of which is hereby incorporated by reference. One aspect of that invention is a reinforced composite material that includes a laminate panel, a strengthening panel that includes a reinforcement embedded therein, and a layer of adhesive disposed between the laminate panel and the strengthening panel to adhere the laminate panel and the strengthening panel together. Preferably, the reinforcement in the strengthening panel may be fiberglass fibers, randomly oriented, or it may be provided in the form of a mesh or the like. In either case, the strengthening panel is preferably a plastic (polymeric) material of the type known as fiberglass reinforced polyester.

Nonetheless, it would be desirable to provide still greater improvements of the inventor's previous work.

The inventor notes the existence of existing products that have a wood/fiber core to which melamine-resin impregnated paper is secured. To the inventor's knowledge, however, no one has previously considered, or succeeded in, directly fusing papers or foil to a fiberglass-reinforced plastic panel.

SUMMARY OF THE INVENTION

Accordingly, one object of the present invention is to provide a material that will have the aesthetic qualities of HPL, can be easily installed on vertical surfaces, and is both lighter in weight and less expensive to manufacture, or both, than is Kemlite's previously-disclosed composite material made from an HPL panel and an FRP or similar strengthening panel. It is also an object to provide such a material that will have sufficient mechanical strength for use in situations where conventional HPL products might not otherwise be usable, such as wall panel applications without a substantial structural substrate.

Of primary importance, and in common with the present inventor's mentioned prior invention, the present invention provides a panel which is installer-friendly and combines the custom color/pattern flexibility of an HPL face with a water-proof, dimensionally stable, user-friendly backer. Further, this laminated panel enhances the impact resistance and moisture resistance of known available decorative vertical wall panels. The subject panel will allow installation of an HPL vertical surface in a most expeditious manner saving labor costs in two ways: drywall preparation, and actual installation time of the panel, when compared to applying HPL directly over drywall.

These objects are met by the present invention, one aspect of which is a reinforced composite material that includes a decorative layer, a strengthening panel that includes a reinforcement embedded therein, and a suitable means of securing the decorative layer and the strengthening panel together permanently. Most preferably, this securing function is achieved by direct thermal fusion of the decorative layer and the strengthening panel to each other, although it is also within the scope of the invention to include one or more additional materials between the decorative layer and the strengthening panel. Preferably, the reinforcement in the strengthening panel may be fiberglass fibers, randomly oriented, or it may be provided in the form of a mesh or the like. In either case, the strengthening panel is preferably a plastic (polymeric) material of the type known as fiberglass reinforced polyester. The thicknesses of the layers may be selected according to need, but as examples, the decorative layer may be made from, typically, one layer of paper (although greater numbers of layers are within the scope of the invention), impregnated with resin and fused with the strengthening panel at a temperature and pressure for sufficiently long to result in the permanent fusion of the plural layers of paper (if more than one are used). The strengthening panel may for example be 0.030, 0.060 or 0.090 inch thick, although the invention is not limited to these specific numbers of papers and thicknesses.

It will be appreciated that one aspect of the present invention involves reducing the weight of the reinforced composite material, by using a small number of sheets or layers of paper in the decorative layer, for example, preferably one, rather than the much larger numbers typically used in existing HPL products (often five to seven layers). Another aspect of the invention is the direct fusing of the decorative layer to the strengthening panel, permitting one to forego the expense and additional materials involved in using an adhesive layer as in the inventor's prior material. It is of course particularly preferred to use both aspects of the invention together, in order to get the maximum benefit, but either may be used without the other if desired, without departing from the scope of the invention.

The present invention also provides a method for the production of such a material, in which there are provided a decorative layer of a type made by preparing at least a first layer of paper and quantity of resin, and a strengthening panel of a type made by embedding a reinforcement in a layer of a binder material. Then, the decorative layer is permanently secured to the strengthening panel, preferably by direct thermal fusion, which is effected by heating the decorative layer and strengthening panel, while subjecting them to pressure.

These and other objects, features and advantages of the present invention will be more fully apparent from a consideration of the following detailed description of the preferred embodiments, taken in conjunction with the accompanying drawings.

DESCRIPTION OF THE PREFERRED EMBODIMENTS

Figure 1:
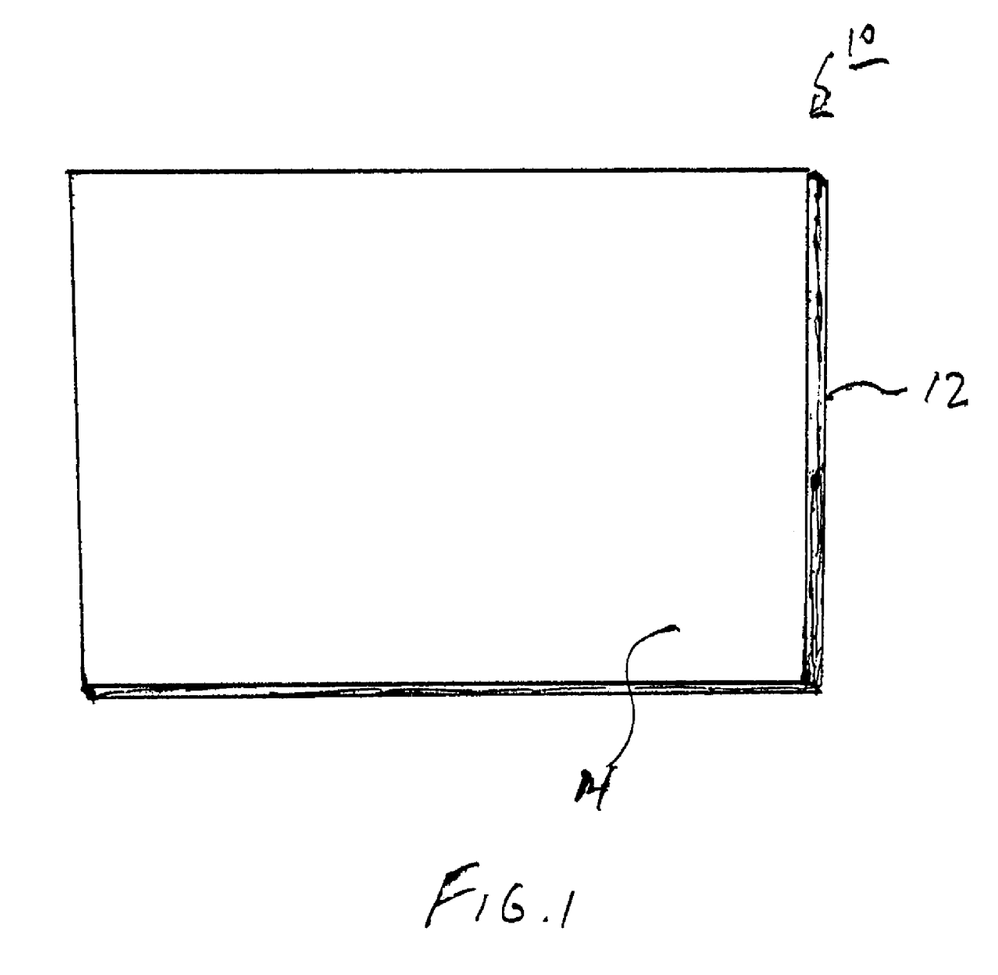
FIG. 1 is a view of a preferred embodiment of a composite material according to the present invention.

The first preferred embodiment of the present invention is a reinforced composite material 10 having two layers 12 and 14, as shown in FIG. 1. One of the layers 12 is termed herein a decorative layer, and the other of the layers 14 is a sheet or panel of a reinforced material. The reinforced material 14 may be a FRP material of a type available from Kemlite Company, while the other layer 12 is made of a small number of sheets of resin-impregnated paper pressed together into a single layer. (Some techniques and materials for use in for the manufacture of such FRP are disclosed in commonly-assigned U.S. Pat. Nos. 4,278,491, 4,110,151, 4,098,630 and 4,048,887, the entire disclosure of each of which patents is incorporated herein by reference.)

The types of paper that may be used in the decorative layer include all those types suitable for use in high pressure laminates (HPL), low pressure laminates (LPL), and saturated papers typically used in thermal fusing operations. In general, one layer of paper may have a decorative pattern on the side facing away from the FRP, so as to be visible in the finished product. Also, while any type of resin suitable for the purpose can be used within the scope of the invention, including any such resins used in manufacturing HPL, the inventor prefers that a polyester or melamine resin be used, and particularly prefers polyester resins, for the reasons described below.

Figure 2A:
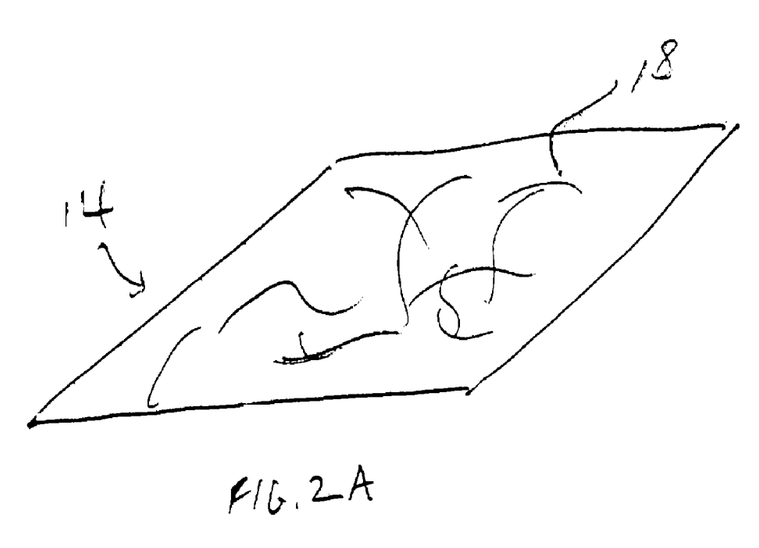
FIGS. 2A and 2B are details showing two varieties of FRP that may be used in the embodiment shown in FIG. 1.
Figure 2B:
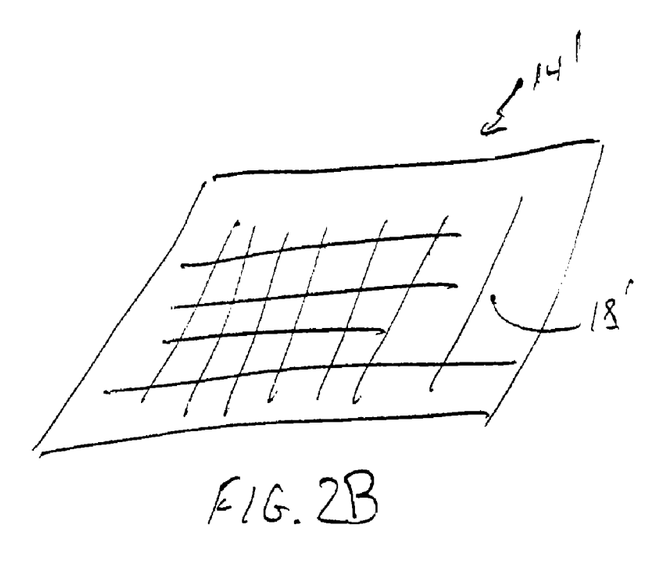

While it is preferred to use a sheet of FRP material for the reinforcing sheet, it is also possible to use other types of reinforced plastic. For example, a plastic sheet 14' having reinforcing material in the form of a mesh 18', rather than in the form of randomly-oriented fiberglass 18, as in FRP, forms a second preferred embodiment of the invention. FIGS. 2A and 2B indicate these two types of material for use in the composite material shown in FIG. 1. In addition, both types of reinforcement may be used together.

Figure 3A:
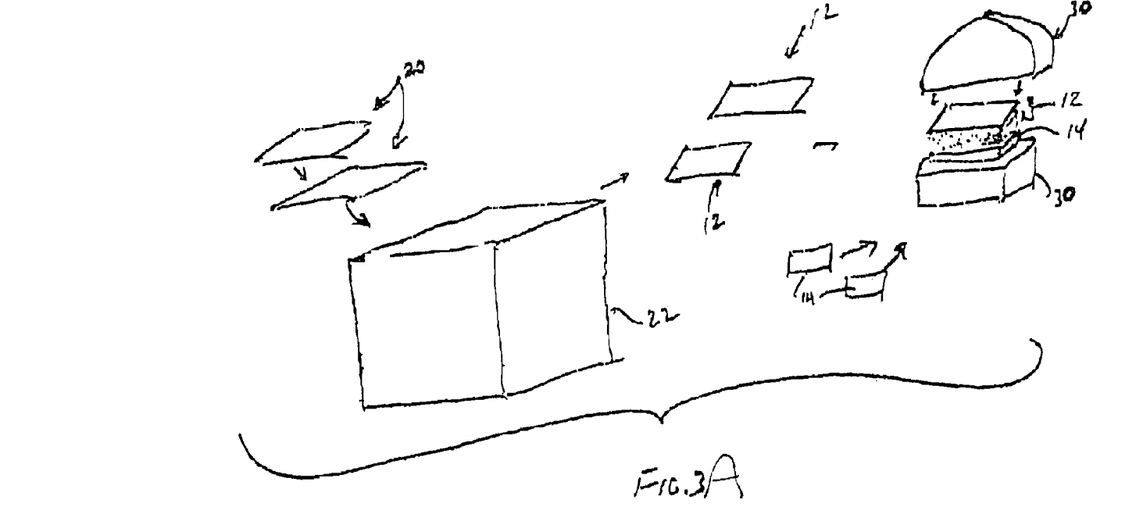
FIGS. 3A and 3B are schematic illustrations of a method according to the present invention.
Figure 3B:
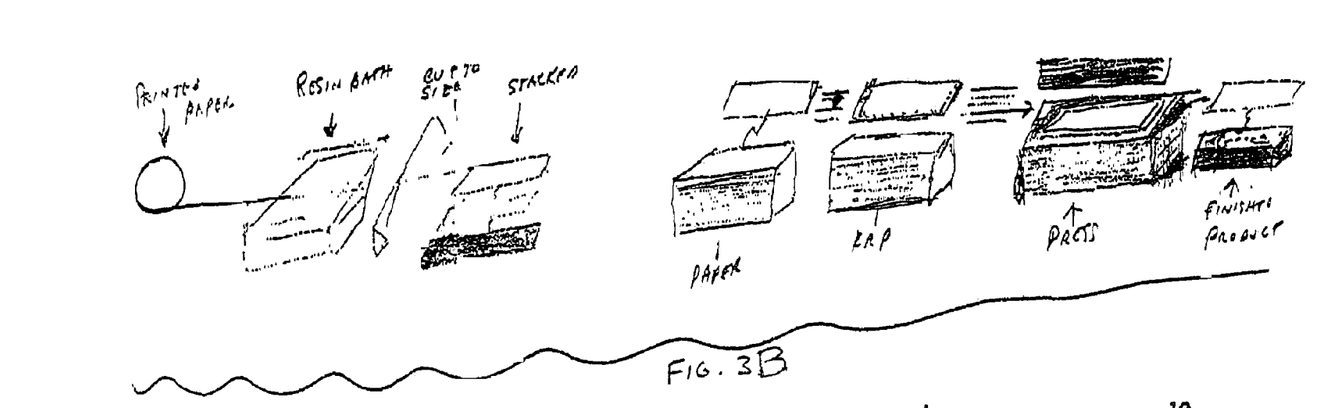
Figure 4:
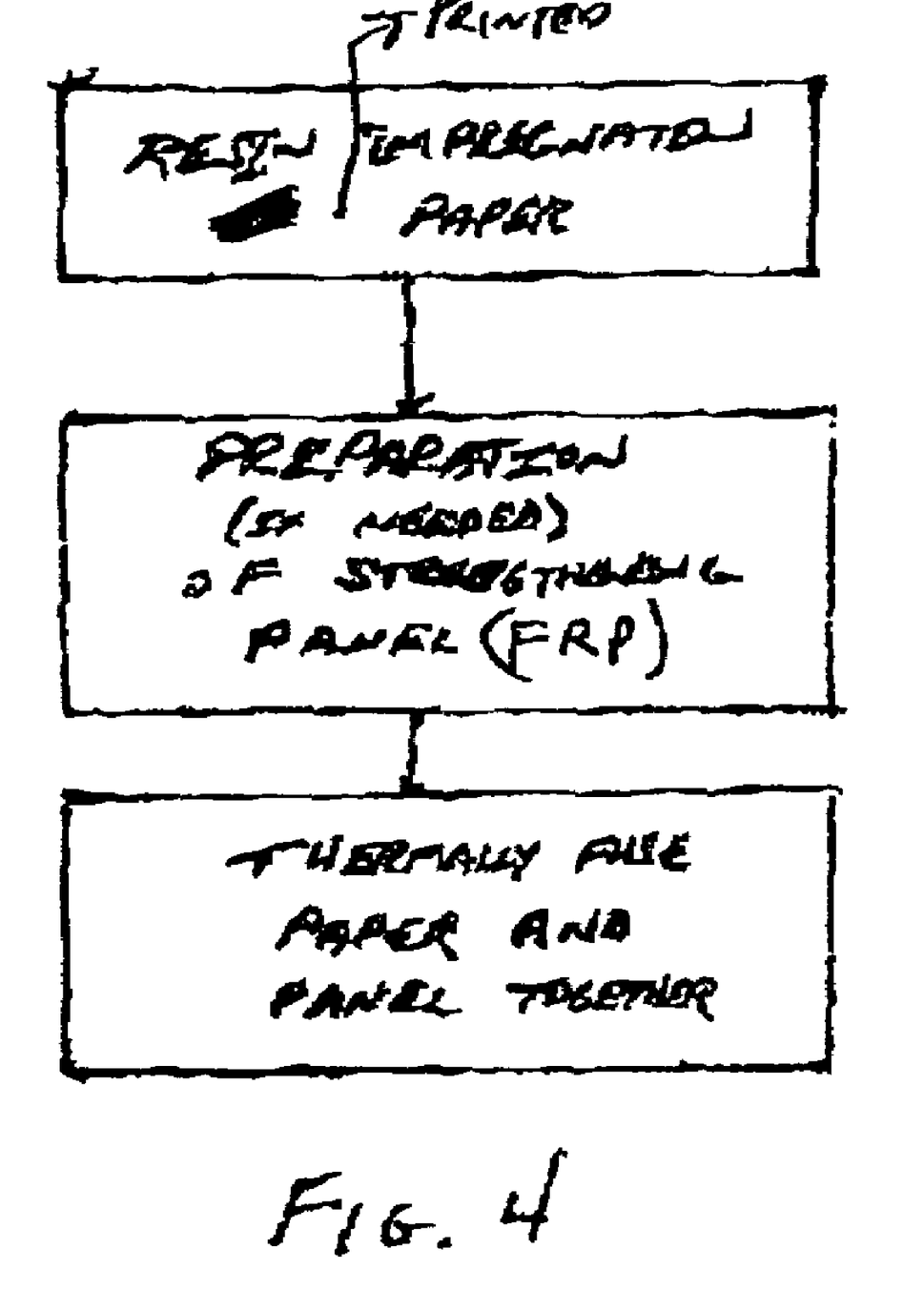
FIG. 4 is a chart illustrating a method of manufacturing a material according to the present invention.

The method of manufacturing the composite material shown in FIG. 1 is straightforward, and is illustrated schematically in FIGS. 3A and 3B (a flow chart of the process is shown in FIG. 4). First, one selects the appropriate decorative-layer materials and reinforced plastic materials to use as the layers. While these materials may be custom manufactured, the FRP material may be a commercially available material instead, as stated above. The printed or plain paper(s) to be used are selected, or are otherwise provided with the desired decorative pattern or coloration (or may, if desired, be left as is; this alternative also is within the scope of the invention). The layers of paper 20 to be used, which are typically but not necessarily one in number per strengthening panel, are then impregnated with the selected resin, for example, by being passed through in a bath 22 of the resin. The saturated paper is then placed above or below the strengthening panel 14 and, in standard thermofusing equipment (indicated schematically at 30), pressed into the composite material 10. For polyester resin, for example, a pressure of 250-300 pounds per square inch ("psi") and a temperature of 200-300° F. have been found to be suitable. A dwell time of 15-20 seconds is adequate, which is less than is required for conventional HPL products, and thus represents a saving in manufacturing processing time. Melamine-resin saturated paper requires slightly higher pressure (e.g., 325 psi) and temperatures (e.g., 350° F.) than are used for polyester-saturated papers.

The saturated paper has a shelf life of about 90 days, within which time it should be used.

It is within the scope of the invention to prepare the surface of the strengthening panel by roughening, for example, by means of sanding; thermofusing the panel with the paper without roughening or other surface preparation is also within the invention.

The thicknesses of the layers of the light-weight reinforced composite material may be selected according to need, but as examples, the decorative layer may be formed from one to three layers of paper, although more may be used if desired. The fewer are used, however, the greater the benefit that will be obtained, as the smaller number of layers of paper will result in lower overall cost of the finished product. The strengthening panel may be 0.030, 0.060 or 0.090 inch thick. The selection of the thickness may depend on any factors; one will of course be ensuring that the resultant product complies with any applicable fire rating or other codes applicable to the intended use of the product. Nonetheless, the invention is not limited to these specific thicknesses and combinations of thicknesses.

Again, while it is contemplated to effect direct thermal fusion of the saturated paper to the strengthening panel or core, it is within the broad scope of the invention to include one or more additional materials in contact with the paper and the core, either covering the contacting surfaces of the paper and core or located only here and there on those surfaces. Various such materials include what are known as a gator ply and as a receptor coat (the latter might, for example, be used to compensate for irregularities in the surface of the strengthening panel surface). Other materials, however, may also (or instead) be used without departing from the scope of the invention.

Figure 5A:
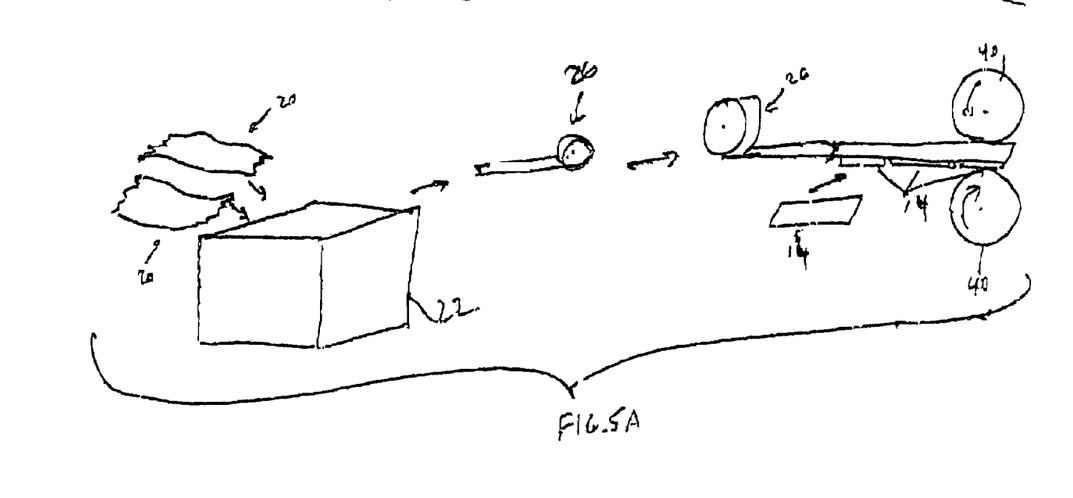
FIGS. 5A and 5B are schematic illustrations of a variation of the method according to the present invention.
Figure 5B:
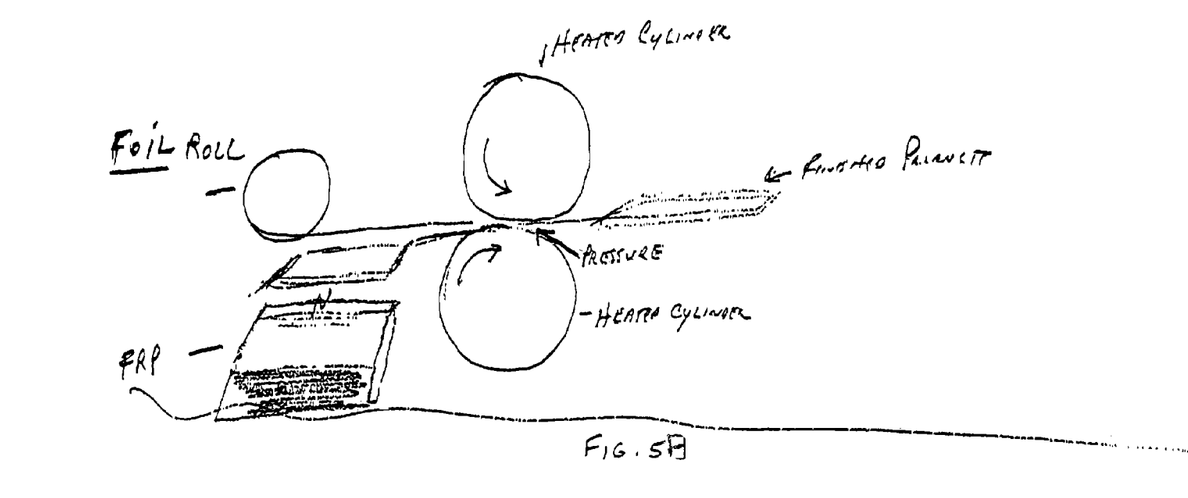

FIGS. 5A and 5B show a further modification of the foregoing embodiments. According to FIGS. 5A and 5B, the paper 20, after saturation with either preferred type of resin or with a preglue operation, results in a roll stock 26 (a "foil"). In this variation, the fusion of the two layers is achieved by rolling the layers together at a suitable temperature and pressure, rather than by pressing the two together in stationary fashion using standard thermofusing equipment. In FIGS. 5A and 5B this is indicated schematically at 40, showing two rollers used for this purpose, pressing together stock from roll 26 and strengthening panels 14. The illustration of panels 14 as arriving from beneath the foil 26 is arbitrary, since those panels could be delivered and placed in contact with the surface of the foil from either above or below, using processing equipment and techniques that are well known.

While the present invention has been described in detail with reference to the currently-preferred embodiments, many modifications and variations of those embodiments will now be apparent to those skilled in the art. Accordingly, the scope of the invention is not to be limited by the details of the foregoing detailed description, but only by the terms of the appended claims.

What is claimed is:

1. A reinforced composite material comprising:
   a decorative layer; and
   a strengthening panel, the strengthening panel including a reinforcement embedded therein,
   wherein the decorative layer and the strengthening panel are thermally fused to each other.

2. The reinforced composite material according to claim 1, wherein the decorative layer comprises resin-saturated paper.

3. The reinforced composite material according to claim 2, wherein the paper is saturated with a resin selected from the group consisting of polyester resins and melamine resins.

4. The reinforced composite material according to claim 1, wherein the decorative layer includes only one layer of paper.

5. A reinforced composite material comprising:
   a decorative layer in the form of a foil; and
   a strengthening panel, the strengthening panel including a reinforcement embedded therein,
   wherein the decorative layer and the strengthening panel are thermally laminated to each other.

6. The reinforced composite material according to claim 5, wherein the decorative layer comprises resin-saturated paper.

7. The reinforced composite material according to claim 6, wherein the paper is saturated with a resin selected from the group consisting of polyester resins and melamine resins.

8. The reinforced composite material according to claim 5, wherein the decorative layer has one side preglued.

9. A reinforced composite material comprising:
   a decorative layer; and
   a strengthening panel, the strengthening panel including a fiber reinforcement embedded therein,
   wherein the decorative layer and the strengthening panel are thermally fused to each other, and
   wherein the strengthening panel is not less than 0.03 inch thick.

* * * * *

UNITED STATES PATENT AND TRADEMARK OFFICE
CERTIFICATE OF CORRECTION

| | | |
|---|---|---|
| PATENT NO. | : 7,250,216 B2 | Page 1 of 7 |
| APPLICATION NO. | : 10/360785 | |
| DATED | : July 31, 2007 | |
| INVENTOR(S) | : Steven J. Taylor | |

It is certified that error appears in the above-identified patent and that said Letters Patent is hereby corrected as shown below:

The Title Page, showing an illustrative figure, should be deleted and substitute therefor the attach title page.

Delete drawings sheets 1-5 and substitute therefor the drawing sheets, consisting of figs. 1-7b as shown on the attached page.

COLUMN 1

Line 20, "wide-spread" should read --widespread--.

COLUMN 2

Line 35, "water-proof," should read --waterproof,--.

COLUMN 3

Line 58, "for" (second occurrence) should be deleted.

Signed and Sealed this

Twenty-seventh Day of May, 2008

JON W. DUDAS
*Director of the United States Patent and Trademark Office*

United States Patent
Taylor (10) Patent No.: US 7,250,216 B2
(45) Date of Patent: Jul. 31, 2007

(54) LIGHTER-WEIGHT REINFORCED DECORATIVE COMPOSITE MATERIAL

(75) Inventor: Steven J. Taylor, Massillon, OH (US)

(73) Assignee: Crane Composites, Inc., Channahon, IL (US)

(*) Notice: Subject to any disclaimer, the term of this patent is extended or adjusted under 35 U.S.C. 154(b) by 597 days.

(21) Appl. No.: 10/360,785

(22) Filed: Jun. 19, 2002

(65) Prior Publication Data
US 2005/0186399 A1    Aug. 25, 2005

(51) Int. Cl.
B32B 27/00    (2006.01)
B32B 29/07    (2006.01)

(52) U.S. Cl. .......... 428/423.7; 428/913.3; 428/425.1; 428/292.7

(58) Field of Classification Search .......... 428/195, 428/36.3, 203, 76, 205, 195.1, 423.7, 425.1, 428/147, 292.7, 165, 913.3; 156/327, 494, 156/243, 166, 307.4; 442/417, 412, 27, 33, 442/34, 212, 295, 297
See application file for complete search history.

(56) References Cited

U.S. PATENT DOCUMENTS

| | | | |
|---|---|---|---|
| 3,616,370 A | 10/1971 | Jennings | 204/159.15 |
| 3,798,111 A * | 3/1974 | Lane et al. | 428/219 |
| 3,936,341 A * | 2/1976 | Nanoux | 156/242 |
| 4,126,719 A * | 11/1978 | Koyanagi et al. | 428/34.5 |
| 4,741,968 A | 5/1988 | Dion et al. | 428/480 |
| 4,927,572 A | 5/1990 | van der Hoeven | 264/22 |
| 5,093,185 A | 3/1992 | Ungar et al. | 428/204 |
| 5,397,636 A * | 3/1995 | Miyao et al. | 428/195.1 |
| 6,093,473 A | 7/2000 | Min | 428/147 |
| 6,242,055 B1 | 6/2001 | Neumann et al. | 427/493 |
| 6,274,674 B1 | 8/2001 | Chang et al. | 525/129 |
| 6,284,327 B1 | 9/2001 | Neumann et al. | 427/493 |
| 6,308,279 B1 | 10/2001 | Macedo | 503/227 |
| 6,325,884 B1 | 12/2001 | Karam | 156/278 |
| 6,340,504 B1 | 1/2002 | Neumann et al. | 427/493 |
| 6,558,799 B2 * | 5/2003 | Takeuchi et al. | 428/423.1 |
| 6,676,798 B1 * | 1/2004 | Murray | 156/307.4 |
| 6,790,252 B2 * | 9/2004 | Smith et al. | 75/240 |
| 6,864,019 B2 | 3/2005 | Hegel et al. | 430/1 |
| 7,081,300 B2 * | 7/2006 | Laurence et al. | 428/423.7 |
| 2001/0054264 A1 | 12/2001 | Votolato et al. | 52/263 |
| 2002/0025426 A1 | 2/2002 | Karam | 428/329 |
| 2002/0043327 A1 | 4/2002 | Macedo | 156/230 |
| 2002/0160680 A1 | 10/2002 | Laurence et al. | 442/394 |

(Continued)

FOREIGN PATENT DOCUMENTS

CA    1083938    8/1980

(Continued)

Primary Examiner—N. Edwards
(74) Attorney, Agent, or Firm—Fitzpatrick, Cella, Harper & Scinto (57) ABSTRACT

A reinforced composite material includes a decorative layer, and a strengthening panel, preferably directly fused to each other. The decorative layer is preferably made of one to three layers of (preferably printed) paper impregnated with a resin such as polyester or melamine resin. The strengthening panel may have a foil facing on one surface for fusion to the decorative layer, or may be roughed and directly fused to the decorative layer without such foil facing. Also provided is a method for the production of such a material.

9 Claims, 5 Drawing Sheets